UNITED STATES PATENT OFFICE.

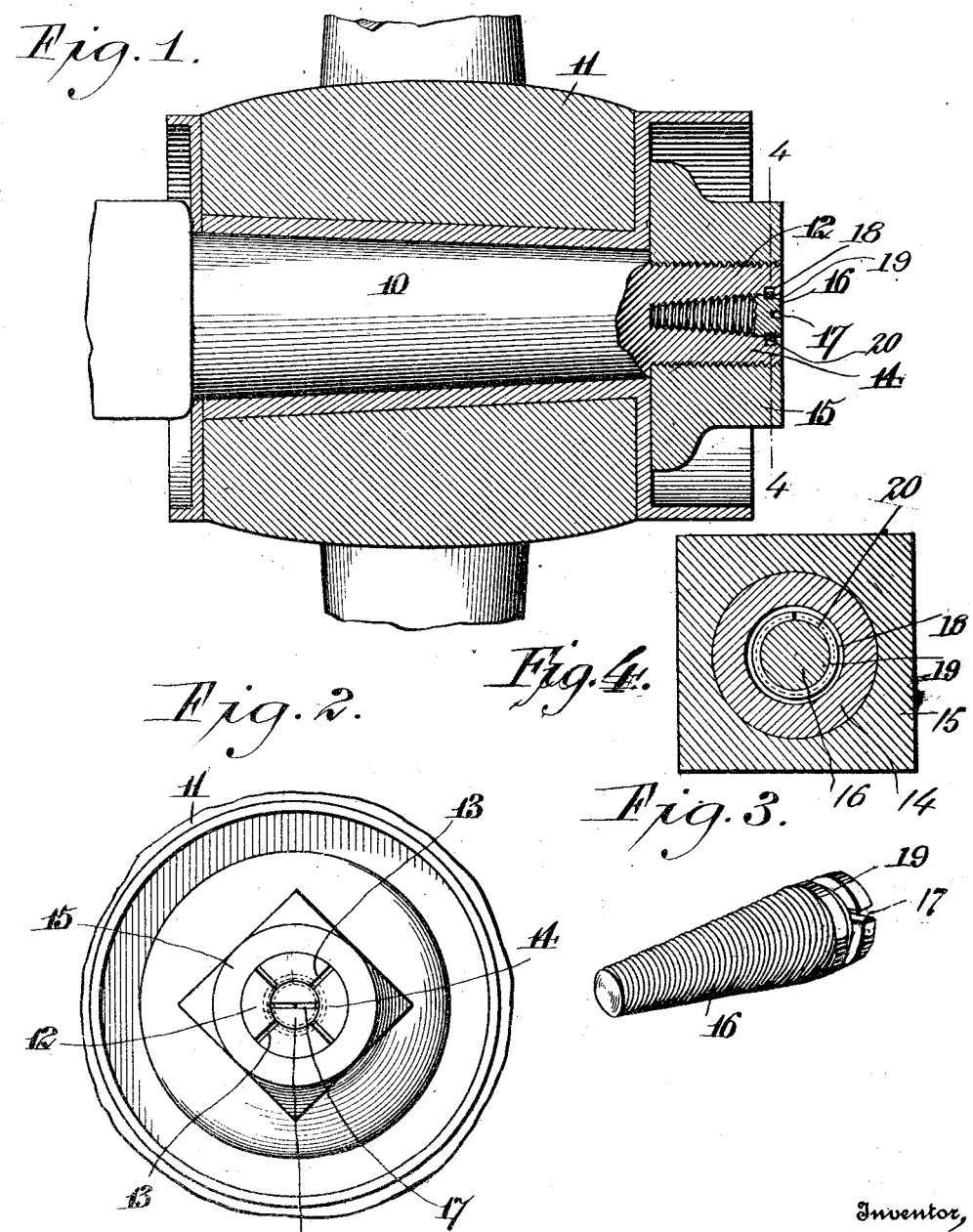

CHARLES E. PARTRIDGE, OF KEENE, NEW HAMPSHIRE, ASSIGNOR OF ONE-THIRD TO JOHN J. WALTZ, OF EASTHAMPTON, MASSACHUSETTS.

HUB ATTACHMENT.

1,075,849.

Specification of Letters Patent.

Patented Oct. 14, 1913.

Application filed September 27, 1912. Serial No. 722,737.

*To all whom it may concern:*

Be it known that I, CHARLES E. PARTRIDGE, a citizen of the United States, residing at Keene, in the county of Cheshire and State of New Hampshire, have invented new and useful Improvements in Hub Attachments, of which the following is a specification.

The invention relates to hub attaching devices and has for an object to provide a device for retaining a hub on the vehicle axle thereof.

The invention embodies, among other features, a securing member for threaded connection with the split end of the axle, having the usual nut threadedly mounted thereon and whereby, when the member is mounted on the axle, the split portions thereof will be extended to lock the nut on the axle, a contractile ring being employed to normally lie in a recess in the axle and extend into a groove in the said member when the same is applied to the axle to lock the member on the axle, thus preventing the accidental removal of the nut or hub from the axle.

In the further disclosure of the invention reference is to be had to the accompanying drawings, constituting a part of this specification, in which similar characters of reference denote corresponding parts in all the views, and in which:

Figure 1 is a vertical sectional view of the device, showing the same applied to an axle having a vehicle hub thereon; Fig. 2 is an end view; Fig. 3 is a perspective view of the securing member; and Fig. 4 is a vertical sectional view taken on the line 4—4 in Fig. 1.

Referring more particularly to the views, I disclose a vehicle axle 10, on which is arranged a vehicle hub 11 of the usual type, the said axle terminating in a reduced end 12, provided with slots 13, extending longitudinally to form split portions 14.

A nut 15 is provided for threaded connection with the split portions 14 of the reduced end 12 of the vehicle axle 10 and the opening formed by the split portions 14 of the said reduced end 12 is preferably of a frusto-conical shape in order that a frusto-conical securing member 16 can be arranged in threaded engagement with the split portions 14, it being readily seen by referring to the views that the split portions are provided with threads on the inner and outer faces thereof, the threads on the outer faces being right or left hand threads and the threads on the inner faces being opposite or opposed thereto, that is to say, if the threads on the outer faces of the split portions are right hand threads, the threads on the inner faces of the split portions will be left hand threads or vice versa.

When the securing member 16 is arranged in threaded engagement with the inner faces of the split portions 14 it will be readily seen that the split portions will be extended so that the threads on the outer faces thereof will bind with the threads on the nut, thus rigidly locking the nut on the reduced end 12 of the vehicle axle 10 and preventing the accidental removal of the hub 11 therefrom. The outer end of the securing member 16 is preferably provided with a diametrically extending groove 17, adapted to receive a screw driver or the like therein for the purpose of arranging the securing member in securing position on the vehicle axle. In order to lock the securing member 16 in position on the axle 10, a circular groove 18 is formed in the axle a distance from the end thereof and a circular recess 19 is formed in the other end of the securing member 16, a contractile spring-like ring 20 being mounted in the groove 18 so that when the securing member 16 is arranged in position on the axle 10 in the manner mentioned, the ring 20 will snap into the recess 19 and lock the securing member 16 rigidly on the reduced portion 12 of the vehicle axle 10.

Having thus described my invention, I claim:

In combination with a vehicle axle having a reduced end slotted to form longitudinally extending split portions, provided with threads on the outer and inner faces thereof, of a nut having threaded connection with the said reduced end and engaging the threads on the outer faces of the split portions, a frusto-conical securing member for threaded connection with the said reduced end, with the threads on the securing member engaging the threads on the inner faces of the said split portions to expand the split portions and bind the same relatively to the said nut, and a contractile ring mounted in a groove in the reduced end of the said vehicle axle and adapted to extend into a recess in the said securing member to lock the said securing member on the said vehicle axle.

In testimony whereof I affix my signature in presence of two witnesses.

CHARLES E. X PARTRIDGE.
his mark

Witnesses:
ELMER S. HILDRETH,
CHARLES W. WILBER.